UNITED STATES PATENT OFFICE.

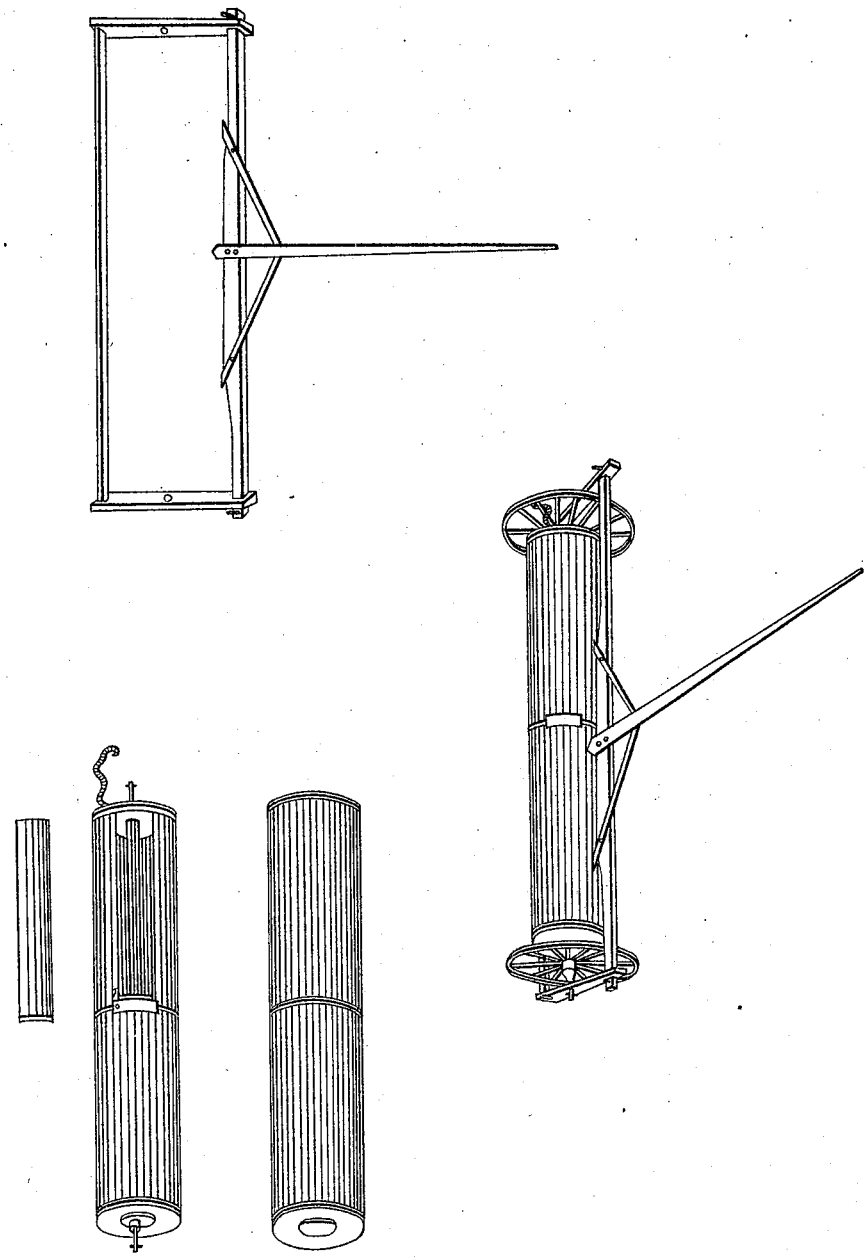

DANIEL T. HILL, OF PLAINFIELD, NEW JERSEY.

IMPROVEMENT IN MACHINES FOR SPREADING LIME, MARL, AND ASHES ON LAND AND EXCHANGING SOILS.

Specification forming part of Letters Patent No. 598, dated February 10, 1838.

*To all whom it may concern:*

Be it known that I, DANIEL T. HILL, of Plainfield, in the county of Essex and State of New Jersey, have invented a new and useful machine for spreading lime, marl, ashes, and plaster on land, also for exchanging the soils of land and sowing grain; and I do hereby declare that the following is a full and exact description, as represented by the drawings herewith transmitted.

My invention consists of a cylinder of convenient size made of slats, with a space left open between the edges of each one to let the manure pass through from the inside to the ground when revolving. Through the center of this cylinder lengthwise an axle-tree is put, so that a wheel can be put on each end and raise it from the ground. Over this another cylinder is placed, made around the same axle, with slats corresponding to those on the one inside, so that on being moved with the hands a little around the inside cylinder the slats will shut up or open the crevices as we wish, that a proper quantity of manure will pass out on the ground. This is a cylinder in a cylinder, the axle-tree being stationary in the inside one, and not so in the head of the outside, so that it can be turned at pleasure. An oblong frame is placed around those cylinders and wheels in which the ends of the axle-tree turn when the machine is drawn, as is represented in the drawings. A tongue or pair of shafts are fastened by braces to one of the sides of this square. My machine is opened for the entrance of the manure by some of the slats being cleated together and hinged on those that remain stationary outside, while the inside cleated slats are pulled out half the length of the machine from under the iron bands that go all around the cylinder at the end of the slats, to keep them on the cylinder-heads. One of those inside pieces is left out in the annexed drawings, so that its place in the cylinder can be plainly seen. One hasp is necessary on the outside to keep the cylinder closed when it is full of manure.

My invention is particularly connected with the wheel. A bar of wood or iron passes in between the spokes from the outside of the cylinder lengthwise, which is movable with the hands, so as to stop the wheel and make the cylinder go round with it, or by being moved back will let the wheel revolve round the axle-tree while the cylinder remains stationary, and will cart the manure without waste to any part of the field. For this purpose I also employ a chain or cord with a hook on the end to go from the outside of the cylinder-head to the spoke of the wheel, as represented plainly in the drawings. Spikes are driven from the outside through the slats of the cylinder, so as to pulverize lumps and mix the manure. As these appear inside, they cannot be shown in the drawings.

What I claim as my invention, and desire to secure by Letters Patent, is—

The combination of the two cylinders of slats or rounds and the mode of connecting them with the wheels, in the manner above described.

DANIEL T. HILL.

Witnesses:
   TRUSTUM MANNING,
   DANIEL D. AYERS.